United States Patent [19]
Vatterott

[11] 3,746,308
[45] July 17, 1973

[54] GAS MANIFOLD CONSTRUCTION

[75] Inventor: Oskar F. Vatterott, St. Louis, Mo.

[73] Assignee: Vatterott & Glassl Tool & Mfg., Inc., St. Louis, Mo.

[22] Filed: Dec. 22, 1971

[21] Appl. No.: 210,948

[52] U.S. Cl. ................... 251/145, 251/146, 285/64, 285/192, 285/197, 285/287
[51] Int. Cl. ............................................. F16l 41/00
[58] Field of Search ........................... 251/145, 146; 285/61, 64, 192, 193, 194, 197, 211, 212, 201, 286, 287, 297

[56] References Cited
UNITED STATES PATENTS

| 2,482,944 | 9/1949 | Shore | 285/287 X |
|---|---|---|---|
| 2,829,794 | 4/1958 | Epps | 285/201 X |
| 3,602,480 | 8/1971 | Demi | 251/146 |
| 1,737,959 | 12/1929 | Congable | 251/145 |
| 2,305,654 | 12/1942 | Wilkinson | 285/192 X |
| 2,306,180 | 12/1942 | Myers et al. | 285/201 |
| 2,788,232 | 4/1957 | Stadthaus | 285/286 X |
| 2,946,518 | 7/1960 | Wahlin | 285/197 X |

*Primary Examiner*—William R. Cline
*Attorney*—Ralph W. Kalish

[57] ABSTRACT

A gas manifold constructed of thin walled tubing adapted for socketing and punch pressing for securely accepting uniquely formed gas valves, nipples, and the like therein, so that the latter are maintained without resort to threading and being adapted for presentation above, below, or aligned with the exterior surface of the tubing.

8 Claims, 15 Drawing Figures

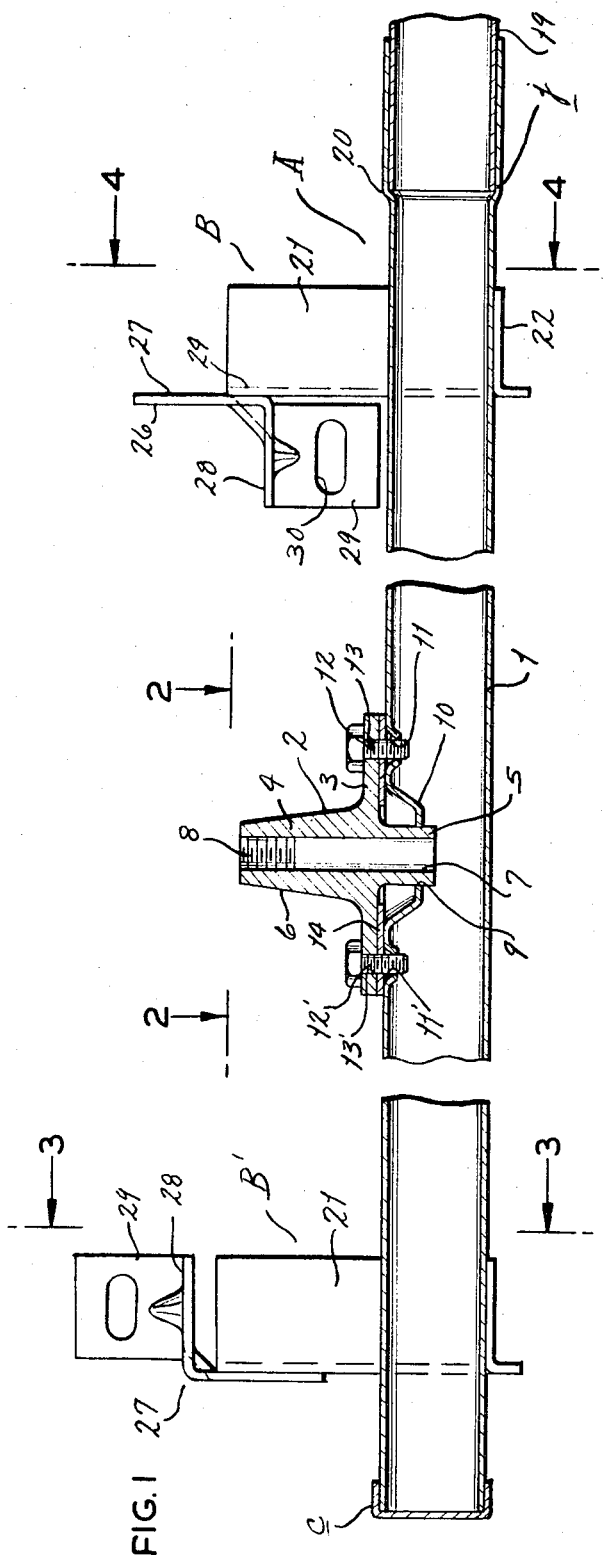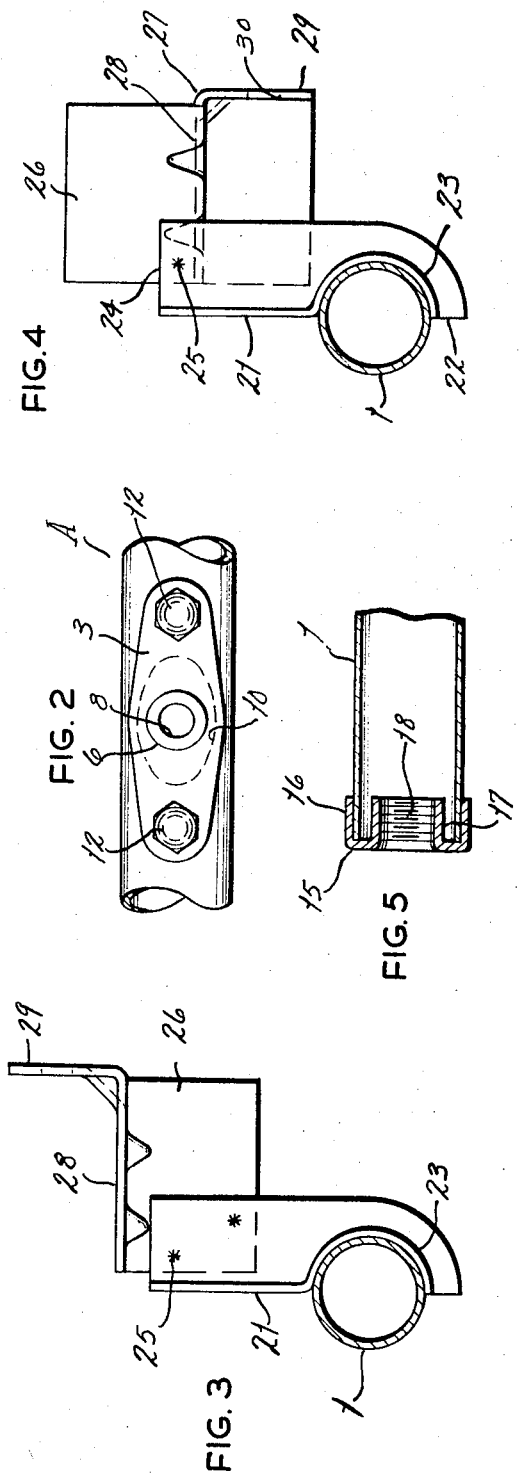

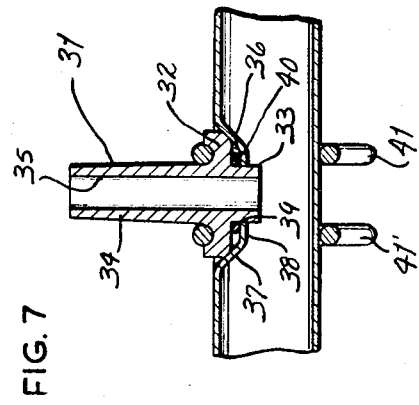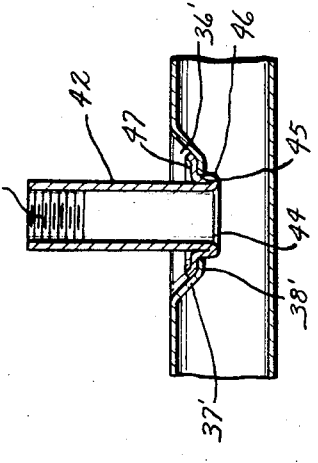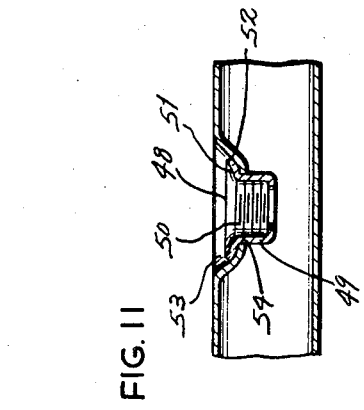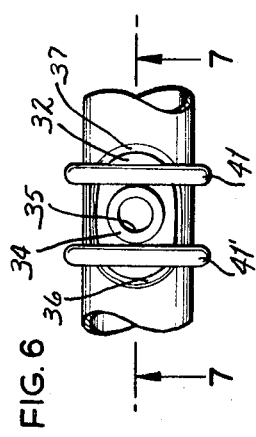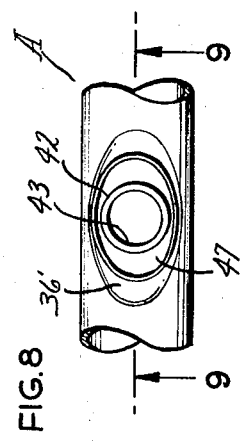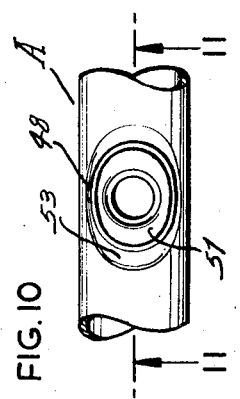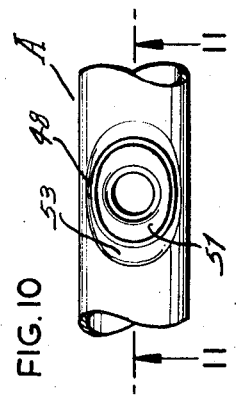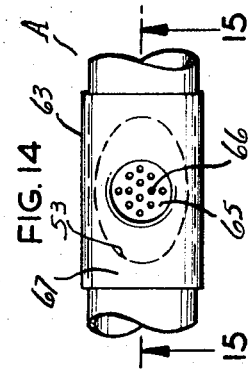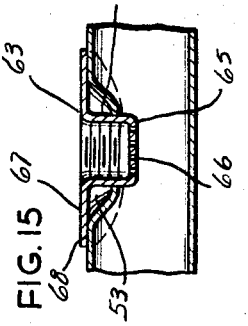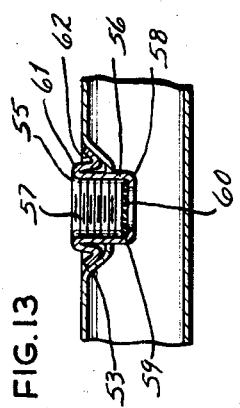

3,746,308

GAS MANIFOLD CONSTRUCTION

BACKGROUND AND SUMMARY OF THE INVENTION

This invention relates in general to gas conduits, and more particularly, to a light-weight manifold especially adapted for facile mounting of valves and nipples therein.

Heretofore, gas manifolds such as utilized in ranges, heaters, dryers, and the like, have been customarily fabricated of iron pipe, being relatively heavy and having thick walls. In order to mount valves within such pipe the latter had to be drilled and then tapped, with chips consistently falling within the tubing to present a continuing potential hazard for jamming of valves and conducing to a perpetual state of uncleanliness. By reason of such means of developing threaded openings the various controls or valves received therein would customarily be located at varying heights so that desired uniformity in appearance and in reliability were not achieved. By swaging, another technique regularly utilized in the installations of controls, there was required the utilization of special tools and equipment which caused an undesired slight raising in the surface of the pipe surrounding the particular opening. Additionally, there were constant difficulties in appropriately suspending or supporting such manifolds, partly because of weight and partly because of the material utilized, with resort to weldments being required. Furthermore, the use of iron pipe, as outlined hereinabove, has involved relatively high costs in labor.

Therefore, it is an object of the present invention to provide a manifold fabricated of relatively light-weight tubing being uniquely adapted for receiving accessories, such as valves and nipples in a secure manner, permitting uniformity of disposition.

It is another object of the present invention to provide a gas manifold of the character stated which is relatively thin walled and obviates development of threaded openings therein or swaged holes for retention of valves and the like.

It is a still further object of the present invention to provide a manifold of the character stated which eliminates the possibility of chips and other particles being inadvertently deposited therein thereby avoiding the potential jamming and other disruptive relationships with the associated valves as has heretofore existed with current manifolds.

It is another object of the present invention to provide a gas manifold of the character stated which, being fabricated from thin walled tubing, is relatively easily worked for either receiving valves, nipples, and the like, or for bending as well as for simplicity of suspension from light-weight brackets thereby conducing to a most substantial manufacturing cost saving.

It is a further object of the present invention to provide a manifold of the character stated which is readily adapted for uniquely accepting valves, nipples, and the like of varying types with substantially like preliminary processing thereby conducing to the extreme versatility of the manifold of this invention.

It is a further object of the present invention to provide a manifold of the character stated which is extremely durable and reliable in usage and which has wide industrial application.

BRIEF DESCRIPTION OF THE DRAWINGS

FIG. 1 is a vertical sectional view of a manifold constructed in accordance with and embodying the present invention illustrating same as supported from brackets and having a gasketed gas valve mounted therein.

FIG. 2 is a horizontal top plan view taken on the line 2—2 of FIG. 1.

FIG. 3 is a vertical sectional view taken on the line 3—3 of FIG. 1.

FIG. 4 is a vertical sectional view taken on the line 4—4 of FIG. 1.

FIG. 5 is a fragmentary vertical sectional view taken at the left hand end of FIG. 1 illustrating an end fitting mounted therein.

FIG. 6 is a fragmentary top plan view of the manifold illustrating another form of a gas valve as maintained by clips therein.

FIG. 7 is a vertical sectional view taken on the line 7—7 of FIG. 6.

FIG. 8 is a fragmentary top plan view of the manifold illustrating one form of nipple mounted therein.

FIG. 9 is a vertical transverse sectional view taken on the line 9—9 of FIG. 8.

FIG. 10 is a fragmentary top plan view of the manifold having another form of nipple mounted therein.

FIG. 11 is a vertical transverse sectional view taken on the line 11—11 of FIG. 10.

FIG. 12 is a fragmentary top plan view of the manifold having a still further form of nipple mounted therein.

FIG. 13 is a vertical transverse sectional view taken on the line 13—13 of FIG. 12.

FIG. 14 is a fragmentary top plan view of the manifold having another form of nipple mounted therein.

FIG. 15 is a vertical transverse sectional view taken on the line 15—15 of FIG. 14.

DESCRIPTION OF THE PREFERRED EMBODIMENT

Referring now by reference characters to the drawings which illustrate the preferred embodiment of the present invention, A designates a gas manifold comprised of a suitable length of thin-walled tubing which may be of the cold rolled welded or seamless type; and hence being of relatively lightweight. The thickness of the wall 1 of manifold A is of such reduced character that the same is not amenable to drilling and tapping as is the case with a customary black iron pipe from which gas manifolds have heretofore been constructed. Accordingly, in order to adapt manifold A for receiving fittings such as valves, nipples, and the like, the same is socketed and then subjected to a punch press to form a recess of selected depth and design.

Referring now to FIG. 1, 2 indicates a gas valve having integrally a flange 3 for normal disposition upon the outer surface of wall 1 of manifold A and a central body 4 which has an extension 5 projecting downwardly of flange 3 for extension into manifold A and an upper portion 6 extending above manifold A; there being an axial bore 7 which is internally threaded at its upper end 8. Manifold A is provided with an opening 9 punched within the base of a recess 10 developed in wall 1 by socketing. It will be observed that the diameter of opening 9 is substantially the same as the outside diameter of extension 5 to conduce to a snug gas-proof fit. Wall 1 is also punched on opposite sides of recess 10 to provide openings 11,11' for accepting the ends of screws 12,12', respectively, engaged within apertures 13,13' formed at the opposite ends of flange 3. Interposed between the underface of flange 3 and the confronting surface of wall 1 is a gasket 14. It will be seen that valve 2 is securely mounted upon the thin walled manifold A with its upper threaded end portion 8 presented at a fixed predetermined distance from wall 1 so that the same will be in appropriate alignment with like valves 2 should there be a mutliplicity of the same mounted spacedly along manifold A.

The simplicity of the mounting of gas valve 2 is apparent from the foregoing in that recess 10 is easily formed by a suitable die and openings 9,11,11' are rapidly punched with their diameters having been predetermined for requisite engagement with valve extension 5 and screws 12,12'. It will be readily observed from the foregoing that manifold A is peculiarly adapted for pretreatment, that is, by socketing and punching so that the related valves and the like can be reliably mounted at points remote from the source of manufacture of said manifold A.

It is also apparent that the present invention obviates the problems attendant with treating iron pipe for receiving valves and the like in that the drilling and tapping of the conduit is not necessary, with elimination of any hazard from chips or flashings falling within manifold A. Additionally, inaccuracies and irregularities in the alignment of multiple gas valves is avoided.

Manifold A at its ends is adapted for closure as by a shallow cap c dimensioned for a snug and secure interfit thereon. Also, if desired, manifold A may receive fittings, as indicated at 15, upon its open ends for effecting interconnection to an adjacent member. Fitting 15 incorporates an annular skirt 16 for embracing the outer surface of manifold A and centrally contains an inwardly extending neck 17 of relatively reduced cross section and being internally threaded, as at 18, for facile engagement purposes. Additionally, the tubing from which manifold A is formed is easily worked for effecting a joint, as at j, with an adjacent section, indicated 19, so that the contouring of manifold A may be of any preselected character to meet the particular use requirements whereby elbow sections and the like may be interposed within the manifold to accord same the desired shape. Thus, at joint j wall 1 may be diametrically stretched, as at 20, for tightly receiving the adjacent end of section 19. The workability of the tubing forming manifold A renders same extremely versatile in overcoming the difficulties experienced heretofore in bending iron pipe to conform to operating conditions.

By reason of its unusual characteristics, manifold A may be quickly and easily maintained in operative position by light-weight brackets B or B' depending upon the environment. Bracket B comprises an angulated vertical member 21 having a front leg 22 which is transversely parallel with the axis of manifold A and being arcuated, as at 23, in its lower portion complementarily to the tubing of manifold A to provide a support surface to which manifold A is secured as by brazing or spot welding. Extending planarwise normal to front leg 22 from one edge thereof is a rearwardly projecting leg 24 to the normally outer face of which is fixed, as by spot welding, as at 25, to a flange 26 of a mounting component 27 which embodies a base 28 planarwise perpendicular to flange 26 and being continuous with one edge thereof; there being another flange 29 which extends from said base 28 in planarwise normal relationship thereto in a direction opposite from that of flange 26 and being also planarwise perpendicular to said flange 26. Flange 29 is provided with a relatively enlarged aperture 30 for projection therethrough of bolts (not shown) for affixing bracket B to any suitable surface. Bracket B is easily formed from sheet metal and is uniquely designed to cooperate with the curvature of manifold A for securement to the same in a consistently reliable manner and yet to be adapted for relative location at any desired point therealong whereby the positioning of brackets B can be dictated by the availability of convenient suspension points.

Bracket B' is comprised of the same components as bracket B, incorporating angulated member 21 and component 27. However, component 27 is in reversed relationship to member 21 in that flange 29 is directed upwardly of base 28 as opposed to downwardly as in bracket B. Thus, this feature of transposing member 21 and component 27 further evidences the unique versatility of the present invention for simplicity of mounting.

Turning now to FIGS. 6 and 7 the adaptability of manifold A for mounting a gas valve, as indicated 31, without screws is illustrated. Said valve 31 embodies a transverse base 32 with an extension 33 downwardly therebelow and an upper elongated projection 34; there being a continuous bore 35 for communication with the interior of manifold A. Said base 32 seats within a recess 36 formed within manifold A having an inclined side wall 37 and a flat bottom wall 38 through the center of which is punched an opening 39, said extension 33 being tightly received within said opening 39 and projecting below same. An O-ring 40 is disposed between the underface of base 32 and the upper face of bottom wall 38 with the outer edges of base 32 wedgingly abutting recess wall 37. Extending about manifold A is a pair of generally annular spring clips 41,41', each of which are engaged over the upper face of base 32 on opposite sides of projection 34 for exerting pressure thereon for forcing base 32 within recess 36. Thus, with valves corresponding to valve 31, the same may be reliably mounted upon manifold A without resort to screws, with stability being assured by the dimensional relationship between base 32 and recess 36 together with the easily applied spring clips 41,41'.

Referring now to FIG. 8, 42 indicates an elongated nipple being internally threaded at its upper end, as at 43, and being suitably formed at its opposite or inner end, as at 44, for engagement within recess 36', which is in all respects similar to recess 36 above described, and having an inclined side wall 37' and flat bottom wall 38' within which latter is an enlarged aperture 45. Said nipple 42 at its lower end is turned reversely upon itself, as at 46, so as to provide a relatively double-wall thickness within the portion projecting through opening 45. The turned back portion in its extremity is generally flattened to form an outwardly extending flange, as at 47, of generally ovate form to conform to recess 36' and which is surfacewise contoured for correspondence to base wall 38' and the adjacent portion of side wall 37' to assure of a firm seating thereupon. Joinder of nipple 42 to manifold A may be completed by brazing at the interface of recess 36' and flange 47. Thus, nipple 42 demonstrates the unique manner in which the same may be secured in operating position with respect to manifold A without resort to the drilling and tapping as has been the rule with black iron pipe.

Referring now to FIGS. 10 and 11, 48 designates a nipple of the type which is disposed below the exterior surface of manifold A comprising a short tubular body 49 which is internally threaded, as at 50, and with an outturned top flange 51 for resting upon adjacent surface portion of the side wall 52 of a recess 53 suitably socketed in manifold A; there being an opening 54 punched in the base of said recess 53 of suitable diameter for extension therethrough of body 49 of nipple 48. Nipple 48 may be made rigid in position as by brazing between the under surface of flange 51 and the confronting surface of recess 53. In contradistinction to nipple 42 above described, nipple 48 is located entirely below the surface of manifold A so that the interengagement of the same to a fitting or the like will be downwardly, as it were, of the top wall and manifold A while a similar union with nipple 42 would be located spacedly outwardly thereof.

Referring now to FIGS. 12 and 13, 55 designates another type of nipple for seated disposition within recess 53; the same having a short tubular body 56 which is internally threaded, as at 57, and slightly inturned at its lower end, as at 58, to provide a continuous annular shoulder 59 for supporting a filter screen 60. At its upper end, body 54 is turned downwardly upon itself, as at 61, and thence outwardly and upwardly, as at 62, to form a flange for disposition against the upper inner portion of side wall 52 of recess 53. As shown in FIG. 13, the upper end of nipple 55 projects slightly beyond the adjacent exterior surface of manifold A. However, said nipple 55 demonstrates a means of forming the upper end thereof so that the degree of extension of nipple 55 beyond manifold A may be easily controlled. Brazing may be resorted to for affixing flange 62 to recess side wall 52.

Turning now to FIGS. 14 and 15, a still further form of nipple is shown as being indicated at 63 for mounted disposition upon manifold A having formed therein a recess which corresponds in all respects to recess 53 above described so that like portions will be referred to by like numbers. Nipple 63 is provided with a tubular body 64 having a base wall 65 extending across its lower end which is spacedly perforated, as at 66, for screening or filtering purposes. At its upper end, body 64 is provided with a top flange 67 planarwise normal to the axis of body 64 and being of greater extent than the maximum cross section of recess 53 at its upper end so that flange 67 in its outer portions will seat upon the exterior surface of manifold A, as at 68, in the areas thereof surrounding recess 53. Flange 67 may be made rigid with manifold A as by brazing.

From the foregoing it will be seen that manifold A with its die-formed recess or socket having an opening of predetermined diameter provided therein adapts same for unique coaction with a multiplicity of specially developed fittings, such as valves and nipples, which obviate tapping and assures of regularity and accuracy in alignment or registration of the various fittings mounted on manifold A. As shown hereinabove, gas valves 2, 31 and nipples 42, 48, 55, and 63 are so uniquely constructed that the same are easily disposed within the manifold recess at a preselected relative position so that regardless of the nature or character of the cooperating accessory to be engaged appropriate posture is assured.

Having thus described my invention, what I claim and desire to obtain Letters Patent for is:

1. A gas manifold construction comprising, in combination, means defining a tubular conduit of thin-walled metal having a continuous side wall, said conduit having at least one recess formed in the side wall thereof with a base terminating spacedly from the confronting, diametrally opposite portion of said side wall, an opening provided in said recess base for communication with the interior of said conduit, and means defining a tubular gas fitting mounted in said recess, said fitting having an outside diameter substantially equal to the diameter of the recess opening for snug reception therein, said recess having an inwardly inclining side wall converging toward the said base, said recess side wall being generally ovate in cross section, and means interengaging said fitting with said ovate side wall of said recess.

2. A gas manifold as defined in claim 1 and further characterized by said fitting having a flange at its upper end, said flange being turned downwardly in a direction toward said base and thence outwardly to provide a terminal portion in substantial complementary configuration with the adjacent portion of the recess side wall, and means rigidly engaging said flange outer portion to said recess outer wall for maintaining said fitting in stable condition within said conduit.

3. A gas manifold as defined in claim 2 and further characterized by said fitting projecting at its upper end beyond the outer face of the side wall of said conduit and extending inwardly within said conduit beyond the said recess base wall.

4. A gas manifold construction as defined in claim 1 and further characterized by said fitting comprising a gas valve housing having an elongate body, there being a bore within said body, said means interengaging said fitting with said ovate side wall comprising a flange, and means engaging said flange for maintaining said valve housing in operative position.

5. A gas manifold construction as defined in claim 4 and further characterized by said engaging means being brazing between said flange and said recess side wall.

6. A gas manifold construction as defined in claim 4 and further characterized by said flange being received within said manifold recess, and clip members extending over said flange and about said manifold for maintaining said valve housing in operative position.

7. A gas manifold construction as defined in claim 1 and further characterized by brackets fixed to said manifold for suspension purposes.

8. A gas manifold construction as defined in claim 7 and further characterized by said brackets being fixed to said manifold by welding, each bracket comprising a mounting component fabricated of sheet metal and comprising mutually perpendicular flanges, an opening being provided in at least one of said flanges for support purposes.

* * * * *